US009274355B2

(12) United States Patent
Huang

(10) Patent No.: US 9,274,355 B2
(45) Date of Patent: Mar. 1, 2016

(54) ELECTRO-OPTICAL MODULATOR AND METHOD FOR MAKING THEREOF

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/108,407

(22) Filed: Dec. 17, 2013

(65) Prior Publication Data

US 2014/0321795 A1 Oct. 30, 2014

(30) Foreign Application Priority Data

Apr. 26, 2013 (TW) .............................. 102115124 A

(51) Int. Cl.
*G02F 1/035* (2006.01)
*G02B 6/32* (2006.01)
*G02B 6/38* (2006.01)

(52) U.S. Cl.
CPC ........... *G02F 1/035* (2013.01); *Y10T 29/49117* (2015.01)

(58) Field of Classification Search
CPC ...................................................... G02F 1/035
USPC ............................................ 385/1–4, 8, 9, 45
See application file for complete search history.

(56) References Cited

U.S. PATENT DOCUMENTS

| 4,958,898 A * | 9/1990 | Friedman et al. ................. 385/3 |
| 5,303,319 A * | 4/1994 | Ford et al. ...................... 385/131 |
| 2008/0212915 A1* | 9/2008 | Ichikawa et al. .................. 385/3 |

* cited by examiner

*Primary Examiner* — Jerry Blevins
(74) *Attorney, Agent, or Firm* — Novak Druce Connolly Bove + Quigg LLP

(57) ABSTRACT

A low-voltage optical modulator includes a substrate, a waveguide, a first pair of electrodes, and a second pair of electrodes. The waveguide is diffused into the top surface of the substrate, into a major branch and a parallel modulating branch. A structure of the first and second pair of electrodes are same. The first pair of electrodes includes a first and a second electrode parallel to each other. The first electrode is formed on the modulating branch and the second electrode is opposite to the modulating branch and away from the major branch. The second pair of electrodes includes parallel third and fourth electrodes. The third electrode is formed on the major branch. The fourth electrode is opposite to the major branch and away from the modulating branch.

17 Claims, 3 Drawing Sheets

ELECTRO-OPTICAL MODULATOR AND METHOD FOR MAKING THEREOF

BACKGROUND

1. Technical Field

The present disclosure relates to integrated optics, and particularly to an electro-optic modulator.

2. Description of Related Art

Electro-optic modulators, such as Mach-Zehner electro-optic modulators, change a refractive index of a branch of a Y-shaped waveguide (hereinafter, the first branch) using a modulating electric field, utilizing an electro-optic effect. Thus, the modulators can alter a phase of lightwaves traversing the first branch. As a result, the lightwaves traversing the first branch can be phase shifted, and thus interfere with lightwaves traversing another branch of the Y-shaped waveguide (hereinafter the second branch). An output of the Y-shaped waveguide is modulated as the output depends on the phase shift, which in turn depends on the modulating electric field. Since only one of the branches is modulated, a required modulating voltage is relatively large, and with low modulating efficiency.

Therefore, it is desirable to provide an electro-optic modulator that can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
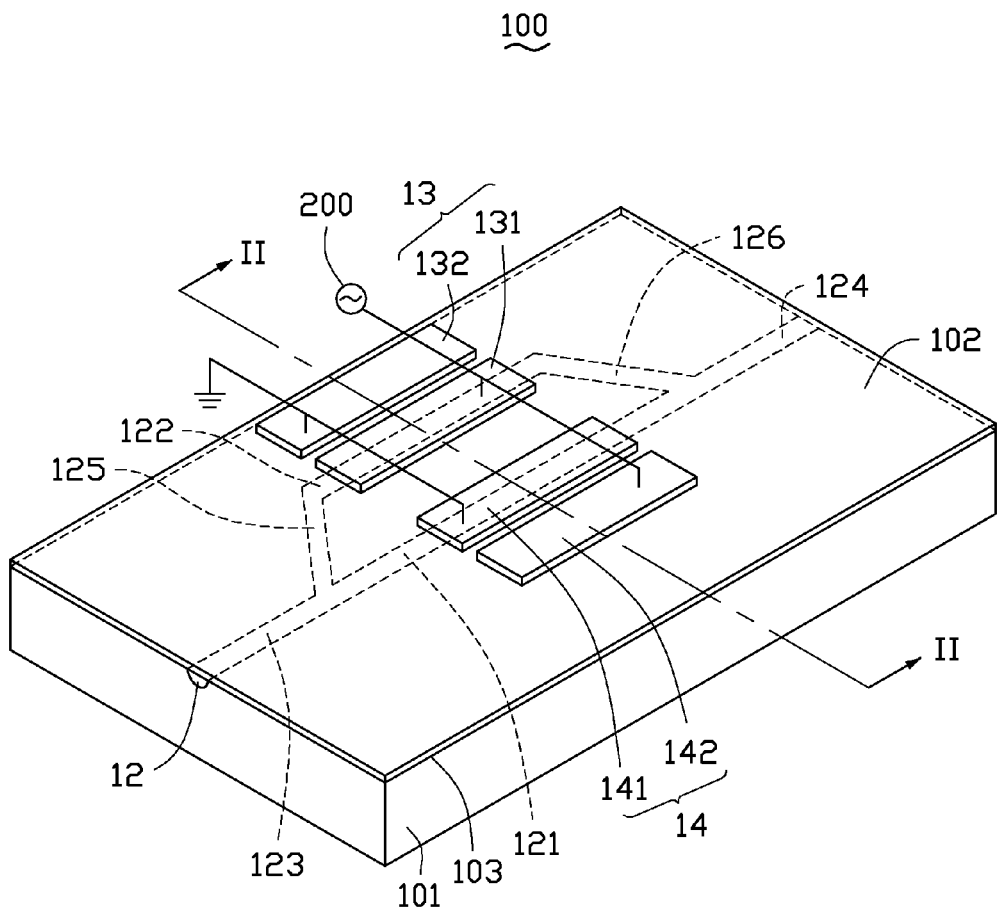
FIG. 1 is an isometric view of an electro-optic modulator, according to an embodiment.
Figure 2:
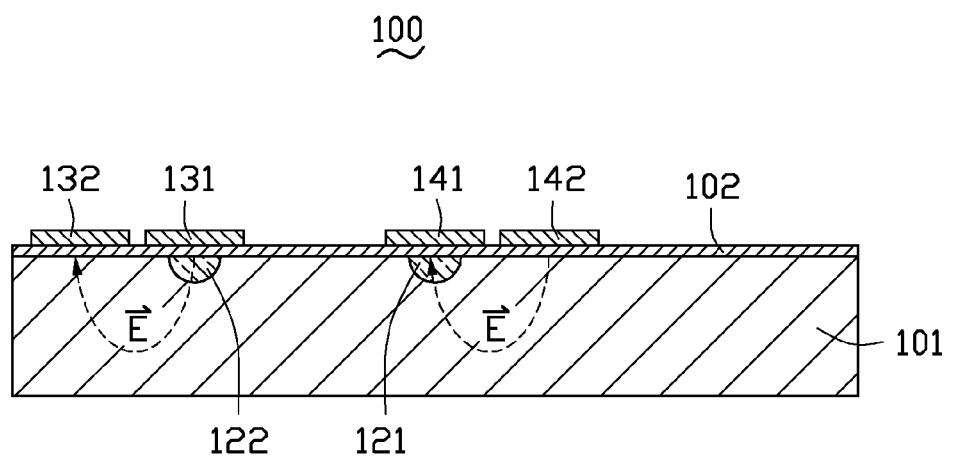
FIG. 2 is a cross-sectional view taken along a line II-II of the electro-optical modulator of FIG. 1.
Figure 3:
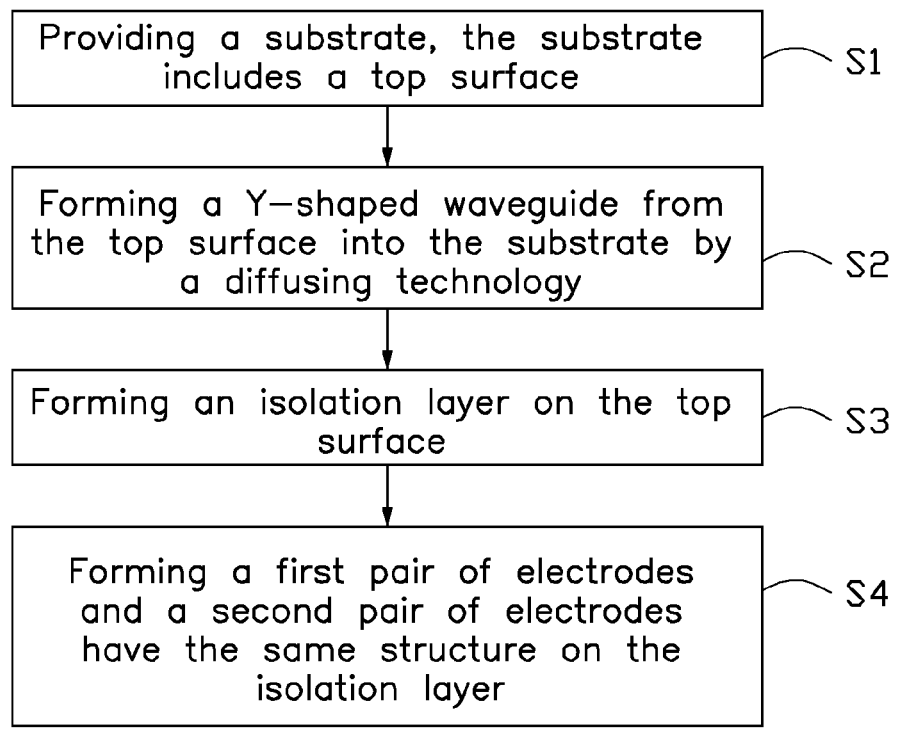
FIG. 3 is a manufacturing flowchart of an electro-optic modulator, according to an embodiment.

FIGS. 1 and 2 show an electro-optic modulator 100, according to an embodiment. The electro-optic modulator 100 includes a substrate 101, an isolation layer 102, a waveguide 12, a first pair of electrodes 13, and a second pair of electrodes 14.

The substrate 101 is made of lithium niobate ($LiNbO_3$) crystal to increase a bandwidth of the electro-optic modulator 100, as $LiNbO_3$ crystals have a high response speed. In this embodiment, the substrate 101 is substantially rectangular and includes a top surface 103.

The waveguide 12 is formed by using diffusion technology, diffusing from the top surface 103 into the substrate 101, for example, a high temperature diffusion technology. In this embodiment, the waveguide 12 is formed in the top surface 103.

The waveguide 12 is Y-shaped and formed in the substrate 101. The waveguide 12 includes a major branch 121, a modulating branch 122, an input section 123, and an output section 124. The major branch 121 and the modulating branch 122 diverge from the input section 123 and converge into the output section 124. The major branch 121, the input section 123, and the output section 124 formed a straight transmission channel. The modulating branch 122 is substantially parallel with the major branch 121.

The waveguide 12 further includes an input branch 125 and an output branch 126. One end of the input branch 125 is connected with the major branch 121 and the input section 123, another end of the input branch 125 is connected with the modulating branch 122. In order to lower an insertion loss, a small angle is defined between the input branch 125 and the major branch 121. Considerations of miniaturization try to decrease length of the input branch 125. Therefore, there is a smaller space interval between the major branch 121 and the modulating branch 122. One end of the output branch 126 is connected with the modulating branch 122, another end of the output branch 126 is connected with the major branch 121 and the output section 124. An angle between the output branch 126 and the major branch 121 is the same as the angle between the input branch 125 and the major branch 121.

The isolation layer 102 is directly formed on the top surface 103. In the present embodiment, the isolation layer 102 is made of silicon dioxide ($SiO_2$).

The first pair of electrodes 13 includes a first electrode 131 and a second electrode 132. The first electrode 131 is formed on the top of the isolation layer 102 and opposite to the modulating branch 122. A length of the first electrode 131 is equal to a length of the modulating branch 122. The second electrode 132 is formed on the top of the isolation layer 102 and opposite to the modulating branch 122 away from the major branch 121. The first electrode 131 and the second electrode 132 are substantially parallel to each other. Polarity of the first electrode 131 is opposite to polarity of the second electrode 132.

Structure of the first and the second electrodes 13, 14 is the same, and the second electrode 14 includes a third electrode 141 and a fourth electrode 142. The third electrode 141 is formed on the top of the isolation layer 102 and opposite to the major branch 121. A length of the third electrode 141 is equal to a length of the major branch 121. The fourth electrode is formed on the top of the isolation layer 102 and opposite to the major branch 121 away from the modulating branch 122. The third electrode 141 and the fourth electrode 142 are substantially parallel to each other. A polarity of the third electrode 141 is opposite to a polarity of the fourth electrode 142.

The first, second, third, and fourth electrodes 131, 132, 141, and 142 have the same structure. A space interval between the first electrode 131 and the second electrode 132 is equal to a space interval between the third electrode 141 and the fourth electrode 142. A width of the first electrode 131 is greater than a width of the modulating branch 122, and a width of the third electrode 141 is greater than a width of the major branch 121.

The first electrode 131 and the fourth electrode 142 are electrically connected to a modulating power supply 200, the second electrode 132 and the third electrode 141 are both grounded. As such, when a modulated microwave is applied to the first pair of electrodes 13 an interpole field which passes through the modulating branch 122 is generated, therefore, a refractive index of the modulating branch 122 and a phase of lightwaves traversing the modulating branch 122 will be altered according to the modulation. Simultaneously, when the modulated microwave is applied to the second pair of electrodes 14 an interpole field crossing the major branch 121 is generated, therefore a refractive index of the major branch 121 and a phase of light waves traversing the major branch 121 will be altered according to the modulation.

Since the first electrode 131 and the third electrode 141 are spaced from the Y-shaped waveguide 12 by the isolation layer 102, direct contact between the first and third electrodes 131 and 141 and the waveguide 12 is prevented. Thereby, transmission loss of a single connection is reduced. In another embodiment, the second electrode 132 and the fourth electrode 142 may be directly formed on the top surface 103.

A manufacturing process of the electro-optic modulator 100 of the present embodiment includes following steps:

S1: providing a substrate 101, the substrate 101 includes a top surface 103.

S2: forming a Y-shaped waveguide 12 on the top surface 103 using diffusion technology, the Y-shaped waveguide 12 is diffused from the top surface 103 into the substrate 101 and includes a major branch 121 and a modulating branch 122. In particularly, a Y-shaped titanium (Ti) film of 700 nm thickness can be deposited on the top surface 103, then the Y-shaped Ti film is diffused from the top surface 103 into the substrate 101 using a high temperature (about 1020 degrees Celsius), and, with a semicircular cross section, a Y-shaped waveguide 12 is formed.

S3: forming an isolation layer 102 on the top surface 103.

S4: separately forming a first pair of electrodes 13 an a second pair of electrodes 14 on the isolation layer 12, and the first pair of electrodes 13 having the same structure as the second pair of electrodes 14. The first pair of electrodes 13 includes a first electrode 131 and a second electrode 132 parallel to each other, the second pair of electrodes 14 includes a third electrode 141 and a fourth electrode 142 parallel to each other. The first electrode 131 is opposite to the modulating branch 122, and a length of the first electrode 131 is equal to a length of the modulating branch 122. The second electrode 132 is located at a side of the modulating branch 122 away from the major branch 121, and parallel with the first electrode 131. The third electrode 141 is opposite to the major branch 121, and a length of the third electrode 141 is equal to a length of the major branch 121. The structure of the first, second, third, and fourth electrodes 131, 132, 141, and 142 is the same. A space interval between the first electrode 131 and the second electrode 132 is equal to a space interval between the third electrode 141 and the fourth electrode 142. A width of the first electrode 131 is greater than a width of the modulating branch 122, a width of the third electrode 141 is greater than a width of the major branch 121.

The present disclosure discloses an electro-optic modulator 10 and its manufacturing method. Since the first pair of electrodes 13 has the same structure as the second pair of electrodes 14, a phase shift of the light waves traversing the major branch 121 and the modulating branch 122 can be modulated simultaneously, and with the same modulation amplitude. Therefore, a required modulating voltage can be reduced by up to 50%, thus increasing modulating efficiency.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. An electro-optic modulator, comprising:
 a substrate comprising a top surface;
 a Y-shaped waveguide formed on the substrate and comprising a major branch and a modulating branch parallel to the major branch;
 a first pair of electrodes comprising a first electrode and a second electrode parallel to the first electrode; and
 a second pair of electrodes comprising a third electrode and a fourth electrode parallel to the third electrode;

wherein the first pair of electrodes have a same structure as the second pair of electrodes; the first electrode formed on the modulating branch and a length of the first electrode is equal to a length of the modulating branch; the second electrode is opposite to the modulating branch away from the major branch; the third electrode formed on the major branch and a length of the third electrode is equal to a length of the major branch; the fourth electrode is opposite to the major branch and away from the modulating branch; the first electrode and the fourth electrode are electrically connected to a modulating power supply, the second electrode and the third electrode are grounded;

wherein the Y-shaped waveguide comprising an input section and an output section; the major branch and the modulating branch diverge from the input section and converge into the output section; the major branch, the input section, and the output section formed a straight transmission channel; the modulating branch is substantially parallel with the major branch;

wherein the Y-shaped waveguide further includes an input branch and an output branch; one end of the input branch is connected with the major branch and the input section, another end of the input branch is connected with the modulating branch; an angle between the output branch and the major branch is the same with an angle between the input branch and the major branch.

2. The modulator of claim 1, wherein the Y-shaped waveguide are formed from the top surface into the substrate using diffusion technology.

3. The modulator of claim 1, wherein a space interval between the first electrode and the second electrode is equal to a space interval between the third electrode and the fourth electrode; the first, second, third, and fourth electrodes having a same structure.

4. The modulator of claim 1, wherein a width of the first electrode is greater than a width of the modulating branch; a width of the third electrode is greater a width of the major branch.

5. The modulator of claim 1, wherein the modulator comprises an isolation layer directly formed on the top surface; the first electrode and the third electrode formed on the isolation layer and spaced from the Y-shaped waveguide.

6. The modulator of claim 5, wherein the second electrode and the fourth electrode are formed on the isolation layer.

7. The modulator of claim 5, wherein the substrate is made of lithium niobate (LiNbO$_3$) crystal, the isolation layer is made of silicon dioxide (SiO2).

8. A manufacturing process of the electro-optic modulator, comprising:
 S1: providing a substrate comprising a top surface;
 S2: forming a Y-shaped waveguide on the top surface using diffusion technology causing the Y-shaped waveguide to be diffused from the top surface into the substrate and where the Y-shaped waveguide comprises a major branch and a modulating branch; and
 S4: separately forming a first pair of electrodes an a second pair of electrodes on the top surface;
 wherein the first pair of electrodes comprises a first electrode and a second electrode parallel to the first electrode; the first electrode formed on the modulating branch, and a length of the first electrode is equal to a length of the modulating branch;
 the second electrode opposite to the modulating branch away from the major branch; the second pair of electrodes comprises a third electrode and a fourth electrode parallel to each other, the third electrode formed on the major branch, and a length of the third electrode is equal to a length of the major branch, the fourth electrode is opposite to the major branch away from the modulating branch; the first electrode and the fourth electrode are electrically connected to a modulating power supply, the second electrode and the third electrode are grounded;

wherein the Y-shaped waveguide comprising an input section and an output section; the major branch and the modulating branch diverge from the input section and converge into the output section; the major branch, the input section, and the output section formed a straight transmission channel; the modulating branch is substantially parallel with the major branch;

wherein the Y-shaped waveguide further includes an input branch and an output branch; one end of the input branch is connected with the major branch and the input section, another end of the input branch is connected with the modulating branch; an angle between the output branch and the major branch is the same with an angle between the input branch and the major branch.

9. The manufacturing process of the electro-optic modulator of claim 8, further comprising:
S3: forming an isolation layer directly on the top surface, and the first electrode and the third electrode formed on the top surface and spaced from the Y-shaped waveguide by the isolation layer.

10. The manufacturing process of the electro-optic modulator of claim 8, wherein the Y-shaped waveguide formed by the following steps:
forming a Y-shaped titanium (Ti) film of 700 nm thickness on the top surface; and
diffusing the Y-shaped Ti film from the top surface into the substrate.

11. An electro-optic modulator, comprising:
a substrate comprising a top surface;
a Y-shaped waveguide formed on the substrate and comprising an input section, an output section, a major branch and a modulating branch parallel to the major branch, the major branch and the modulating branch diverge from the input section and converge into the output section; the major branch, the input section, and the output section formed a straight transmission channel;

a first pair of electrodes comprising a first electrode and a second electrode parallel to the first electrode; and
a second pair of electrodes comprising a third electrode and a fourth electrode parallel to the third electrode;
wherein the first pair of electrodes have a same structure as the second pair of electrodes; the first electrode formed on the modulating branch and a length of the first electrode is equal to a length of the modulating branch; the second electrode is opposite to the modulating branch away from the major branch; the third electrode formed on the major branch and a length of the third electrode is equal to a length of the major branch; the fourth electrode is opposite to the major branch and away from the modulating branch; the first electrode and the fourth electrode are electrically connected to a modulating power supply, the second electrode and the third electrode are grounded;
wherein the Y-shaped waveguide further includes an input branch and an output branch; one end of the input branch is connected with the major branch and the input section, another end of the input branch is connected with the modulating branch; an angle between the output branch and the major branch is the same with an angle between the input branch and the major branch.

12. The modulator of claim 11, wherein the Y-shaped waveguide are formed from the top surface into the substrate using diffusion technology.

13. The modulator of claim 11, wherein a space interval between the first electrode and the second electrode is equal to a space interval between the third electrode and the fourth electrode; the first, second, third, and fourth electrodes having a same structure.

14. The modulator of claim 11, wherein a width of the first electrode is greater than a width of the modulating branch; a width of the third electrode is greater a width of the major branch.

15. The modulator of claim 11, wherein the modulator comprises an isolation layer directly formed on the top surface; the first electrode and the third electrode formed on the isolation layer and spaced from the Y-shaped waveguide.

16. The modulator of claim 15, wherein the second electrode and the fourth electrode are formed on the isolation layer.

17. The modulator of claim 15, wherein the substrate is made of lithium niobate ($LiNbO_3$) crystal, the isolation layer is made of silicon dioxide (SiO2).

* * * * *